J. BIJUR.
ELECTRICAL SYSTEM FOR MOTOR VEHICLES.
APPLICATION FILED JULY 7, 1914.

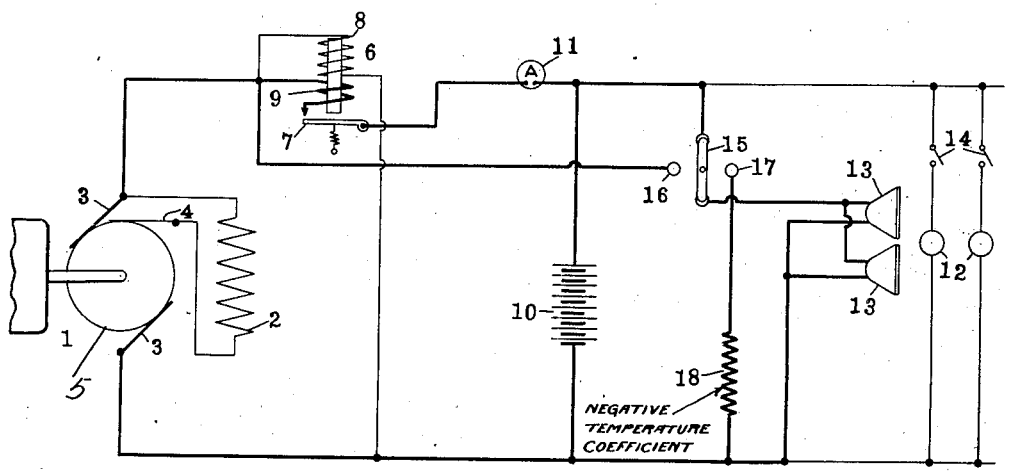
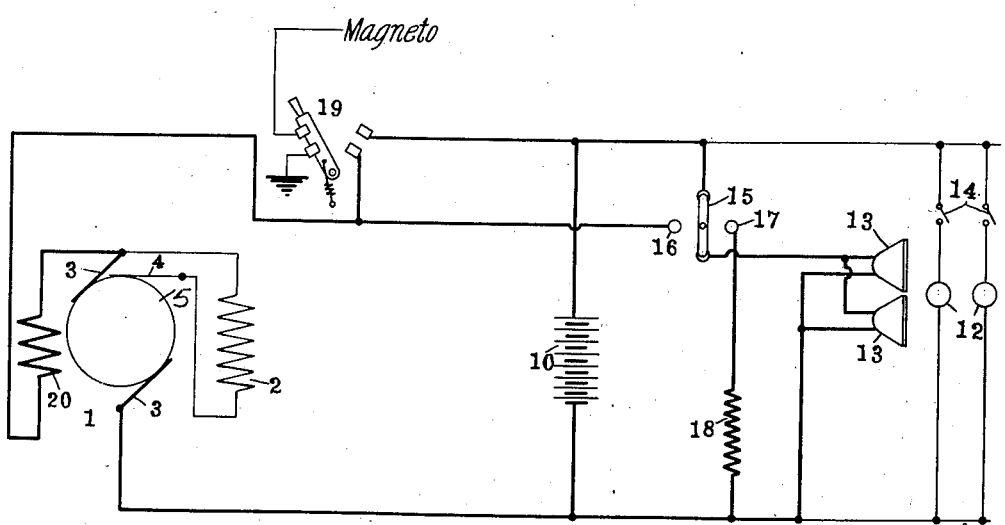

1,298,442.

Patented Mar. 25, 1919.

WITNESSES:
C. F. Volk.
J. Thomson

INVENTOR
J. Bijur
BY
Duell, Warfield & Duell
ATTORNEY

J. BIJUR.
ELECTRICAL SYSTEM FOR MOTOR VEHICLES.
APPLICATION FILED JULY 7, 1914.

1,298,442.

Patented Mar. 25, 1919.
3 SHEETS—SHEET 3.

WITNESSES
C. F. Polk
J. Thomson.

INVENTOR
J. Bijur
BY
Duell, Warfield & Duell.
ATTORNEYS

UNITED STATES PATENT OFFICE.

JOSEPH BIJUR, OF NEW YORK, N. Y., ASSIGNOR, BY MESNE ASSIGNMENTS, TO BIJUR MOTOR APPLIANCE COMPANY, A CORPORATION OF DELAWARE.

ELECTRICAL SYSTEM FOR MOTOR-VEHICLES.

1,298,442.  Specification of Letters Patent.  Patented Mar. 25, 1919.

Application filed July 7, 1914. Serial No. 849,442.

*To all whom it may concern:*

Be it known that I, JOSEPH BIJUR, a citizen of the United States, residing at New York, in the county of New York and State of New York, have invented certain new and useful Improvements in Electrical Systems for Motor-Vehicles, of which the following is a full, clear, and exact description, such as will enable others skilled in the art to which it appertains to make and use the same.

This invention relates to electrical regulating systems, and with regard to certain more specific features, to a constant-current electrical system for use in connection with variable-speed generators such as are found on automobiles.

The invention has a number of objects, among which may be mentioned the provision of constant-current regulation with efficient automatically acting means for protecting the several parts from excessive voltage; the provision of reliable and durable instrumentalities for absorbing an appreciable portion of the generator output whenever the translation devices ordinarily utilizing such portion are not in use; and the provision of a simple and easily constructed system of regulation adapted to meet the exacting demands of economy and reliability in vehicle lighting and ignition. Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings, in which are shown one or more of various possible embodiments of the several features of the invention, Figure 1 is a diagrammatic illustration of an automobile-lighting system embodying certain features of the present invention;

Fig. 2 is a modification illustrating a different form of dynamo-electric machine, and different sets of connections with the main switch;

Similar reference characters refer to similar parts throughout the several views of the drawings.

Figure 3:
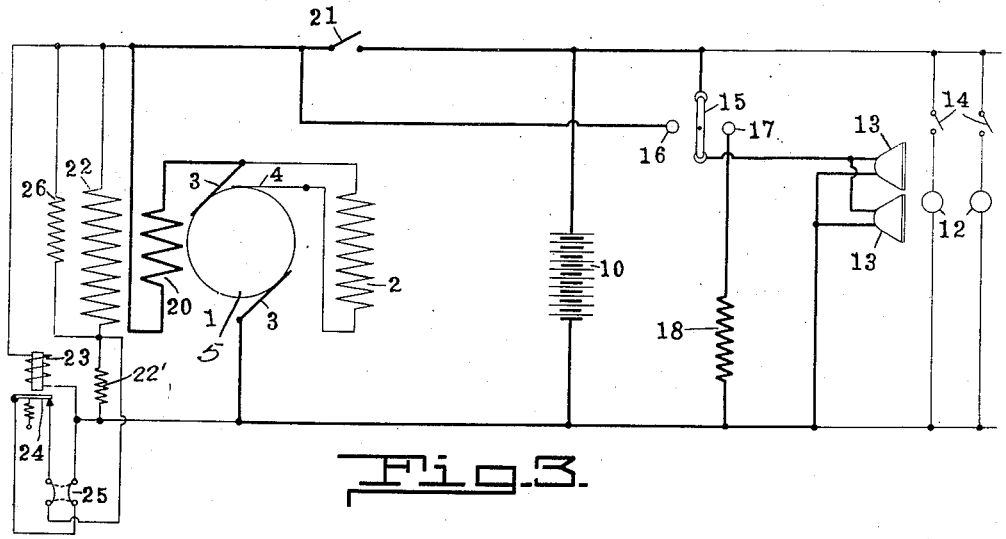
Fig. 3 shows a modified system in which the normal regulation is for constant voltage, with the constant-current feature in operation under certain conditions.

Referring now more particularly to Fig. 1 there is illustrated at 1 a dynamo provided with a shunt field 2 connected across one of the main brushes 3 and a third brush illustrated diagrammatically at 4. If the dynamo be driven at a variable speed, as from the engine of an automobile or the axle of a railway car, the tendency of the output of the dynamo to increase above normal with an increase of speed will result in an increase of the cross-magnetizing flux in the armature 5 distorting the resultant flux in such a way as to decrease the electro-motive force across the shunt field 2. This in turn decreases the excitation until the current output of the generator is restored to practically its normal value. Likewise, with a decrease of speed and accompanying decrease or tendency to decrease on the part of the current, the cross-magnetizing flux will be decreased, the resultant flux will be brought more nearly in line with the flux from the field poles, the voltage across the field will increase and the resulting increase of excitation will restore the generator current to its normal value. The type of regulation described is commonly known as "constant current regulation" and will be so designated in the following. It should be noted, however, that this regulation is only approximate for constant current. An automatic switch is illustrated somewhat conventionally at 6 as comprising a switch member 7 connected to be opened or closed by a voltage coil 8 and current-coil 9, wound to assist each other when the generator is delivering current, and to oppose, to effect the positive opening movement of the switch 6 when the generator speed falls low enough to permit a back discharge from the battery 10. While the generator is rotating above a predetermined minimum speed the main switch 6 is ordinarily closed, the generator current passing through the main switch contacts 7, the ammeter 11, thence through the secondary battery 10 or, if the small lamps 12 or head-lights 13 are burning, the generator current divides, part of it passing through the battery 10 and part through the lamps that are connected, at the moment, to the mains. For the purpose of connecting and disconnecting the lamps, switches are provided as at 14, 15 with additional contacts 16, 17 on the latter for a purpose hereinafter explained. Referring now to the generator regulator it will be noted that during normal operation the current output of the generator is maintained practically constant, any tendency toward departure from constancy being met and remedied by the third-brush regulator illustrated at 2, 3, 4. If, for instance, the opposition to the passage of the generator current through the external circuits be increased, as by turning off lamps or the progressive increase of counter electromotive force of the battery, or by the opening of the main circuit accidentally at the main switch 6 or elsewhere, the action of the constant-current regulator will be such as to increase the generator voltage in an attempt to force through the external circuits the same normal amount of current that had been passing therethrough before the opposition was increased. If the increased opposition is due to relatively small changes such as the turning off of small lamps or the rise in voltage of the battery, then the resulting increase in generator voltage is a matter of no moment, especially since the current through the storage battery can be increased without a corresponding increase in its terminal voltage. If, however, the increase in opposition is due to the complete opening of the main circuit somewhere, or to the turning off of a major portion of the lamp load, the voltage rise at the generator might well be injurious if not disastrous. In order to avoid the injurious consequences of such a rise in voltage under certain circumstances, there is provided, according to the embodiment of the invention illustrated in Fig. 1, a means for decreasing the net electrical opposition of the external circuits to offset the increase in opposition occurring whenever the head-light circuit or other major portion of the load is disconnected. To this end the head-light switch 15 is adapted to connect the head-lights 13 across the mains when the switch is in one position, and when the switch is turned to disconnect the head-lights, such movement automatically completes a connection between the contacts 16, 17 thereby connecting across the mains a resistor 18. Furthermore, by having the resistor circuit connected to the mains on the generator side of the main switch, it is possible to use a current absorbing means that does not drain the battery when the main switch is open.

If now the resistor is called upon to carry the entire output of the dynamo, due, for instance, to an accidental break in the battery circuit, the constant-current regulator will effect an increased excitation until the current through the resistor alone is equal to the constant-current standard formerly divided between the resistor and battery. If the temperature coefficient of the resistance material be zero or positive the voltage rise at the generator will be equal to or greater in ratio than the increase in current through the resistor; this rise is reduced according to the preferred embodiment of the present invention by having the resistor consist partly or entirely of a material of negative temperature coefficient whereby the percentage rise in dynamo voltage when the resistor is called upon to carry the entire load is less than the percentage rise in resistor current. A number of materials might be used to effect this result. The choice of material would depend naturally upon the physical characteristics and cost. The use of boron, preferably in the form of a filament for an incandescent lamp or series of lamps, is suggested and will be referred to hereinafter in connection with Fig. 4.

The operation of the invention illustrated in Fig. 1 is as follows: With the dynamo at rest the automatic switch 6 is open, the battery 10 is supplying current to any of the small lamps 12 that happen to be connected, and if the head-light switch is in the position illustrated in Fig. 1, the battery is supplying current to the head-lights 13. As the dynamo speed increases from zero, due, for example, to the starting of the engine to which it is attached, the dynamo "builds up" in much the same manner as an ordinary shunt machine, and when its voltage reaches a predetermined value the voltage coil 8 of the automatic switch 6 closes the contacts 7 connecting the dynamo to the battery and lamps. The dynamo current passing through the current coil 9 on the main switch assists the voltage coil 8 in holding the contacts 7 closed. With a further increase in dynamo speed the third-brush regulator brings the dynamo current up to the predetermined standard value and holds it there with further variations in speed. The current divides between the battery and the resistor if no lamps are on, between the battery and the lamps if the head lamps are on, and between the battery, resistor and small lamps, if the head lamps are off and the small lamps on. If the head-lights have been burning and are turned off, the resistor replaces the head-lights as a load upon the dynamo so that charging of the battery at an injuriously high rate is avoided. As the battery becomes charged the voltage of the generator does not rise as the resistor will take an increasing portion of the current owing to its negative temperature co-efficient. Thus, the battery obtains the proper tapered charge. There is a waste of current through the resistor, it is true, but in vehicle lighting and analogous uses this waste is not a matter of moment, since power is cheap and the advantages of reliable regulation far outweigh the inappreciable expense occasioned by having this resistor across the generator for part of the time. If when the head-lights are not burning the battery be accidentally disconnected from the mains or if a break in the main circuit would occur at the automatic switch or beyond that point, practically the entire load of the dynamo is thrown upon the resistor which by virtue of its negative temperature coefficient readily absorbs this load without an undue rise of voltage across its terminals. In this manner burning out of the field is effectively avoided. When the dynamo is not delivering current the resistor does not drain the battery because at such time the automatic switch is open. While the resistor is illustrated as adapted for use alternately with the head-lights, it will be obvious that the resistor switch 15 might be connected with other translating devices that absorb the major part of the load, or a plurality of such switches and resistors might be provided each for use in connection with a suitable fraction of the work circuit.

In Fig. 2 the dynamo 1 is provided, as before, with the shunt-field 2 connected across one of the main brushes 3 and a third-brush 4 for constant-current regulation, and the battery 10, resistor 18, small lamps 12, head-lights 13 and lamp switches 14, 15 are arranged as before. In the present embodiment of the invention however, the automatic switch 6 of Fig. 1 is replaced by a manual switch illustrated conventionally at 19 as comprising a two way knife-switch adapted when in one position to connect the dynamo to the battery and the magneto to the ignition, in the other position to disconnect the dynamo from the battery and stop the ignition by grounding the magneto. As the dynamo in this instance is adapted for use either as a generator or starting motor, it is provided with a series field 20 so wound and connected with respect to the shunt-field 2 as to aid the latter to produce a strong field for use in starting and to oppose the shunt field when the dynamo is being run as a generator.

The operation of the system of Fig. 2 is as follows: With the engine at rest the dynamo 1 may be connected as a motor to start the engine by moving manually the main switch 19 to the right hand operating positions. A strong current at once passes from the battery through the series field, shunt field and armature, providing what is practically a series motor with a strong starting torque. At the same time the ignition is connected to the magneto, so that when the motor has brought the engine up to the necessary speed the engine will normally begin to rotate under its own power. When this occurs no more current will be delivered to the dynamo because of the greatly increased electro-motive force of the armature, and instead the dynamo will act as a generator delivering current to the battery, to whatever small lamps are in circuit, and to the head-lights or resistor according to the position of the head-light switch 15. During this part of the cycle of operations the series field 20 acts differentially to decrease the excitation with any tendency toward increased current, thus assisting the shunt-field 2 to maintain the dynamo current at a constant value.

Referring now to Fig. 3 there is illustrated, as before, a dynamo 1 with a series field 20, a third-brush shunt-field 2, together with a battery 10, small lamps 12, and a resistor 18 and head-lights 13 adapted for alternate connection to the mains as by the head-light switch 15. The main switch illustrated conventionally at 21 may be arranged for automatic or manual operation according to Fig. 1 or Fig. 2, respectively. In the present embodiment of the invention the dynamo is provided with a third field 22 connected in shunt across the dynamo mains in a circuit which includes a resistance 22' adapted to be periodically short-circuited by the voltage-controlled vibrator 24. The vibrator contacts may be reversed in polarity by any suitable means such as the reversing switch 25 which for convenience may be mechanically connected with one of the work-circuit switches so that the direction of current flow through the vibrator contacts will be reversed with each successive operation of this work-circuit switch. This may be accomplished by mechanism substantially as shown in my Patent #1,197,572, granted September 5th, 1916, and is not shown here as it is not part of my present invention. In order to reduce the sparking at the contacts of the vibrator and to improve the operation of the voltage regulator in other ways, there is provided at 26 a resistance in shunt about the shunt field 22. Inasmuch as a number of features of this regulator are set forth in detail in my co-pending application, Serial No. 598,532, filed December 21, 1910, the electrical reasons for various connections need not be here discussed in detail. Furthermore, the regulators, both current and voltage, are illustrated simply as examples of regulators that have been found to work advantageously in combination with certain other features of the present invention. It will be obvious for instance, that the protection secured through the resistor 18 would be attained with any one of a number of types of constant-current regulators; and other instances might be cited at length to indicate the wide field of usefulness of the present invention in the several embodiments illustrated in the accompanying drawings.

The operation of the apparatus of Fig. 3 is as follows: When the dynamo 1 is at rest, any lamps burning are taken care of by the battery 10. When the engine is to be started the dynamo is connected with the battery by closing the main switch 21. The dynamo starts practically as a series-motor as in Fig. 2, and as the engine begins to rotate under its own power the voltage regulator begins to act concurrently to maintain the dynamo voltage at a predetermined standard throughout variations of speed. If the voltage coil 23 were the only regulator provided, the necessary range of current in the shunt field 22 would require such an IR drop across the series resistance 22' that objectionable arcing at the contacts 24 might be encountered. If, however, as in the present embodiment of the invention, the voltage regulator needs simply to regulate the generator throughout a limited range, with a current regulation operative at speeds above say thirty miles per hour, the ohmic drop across the series resistance 22' may be made comparatively small and in this way for practically all of the time the generator is running the advantages of voltage regulation are secured, without the objectionable sparking that might be encountered if the current regulation were not provided. The percentage of time that the generator is running above the critical speed where the current regulator begins to act is so slight that the possible overcharging of the battery during such time may be disregarded. Furthermore, the advantageous features of constant-current protection in case the battery is removed or in the event of other accidental increase in the net opposition of the external circuit are secured whatever the engine speed may be at the time this protection is needed. In this way a regulation is secured that offers certain advantages over a regulation for voltage alone or for current alone.

Figure 4:
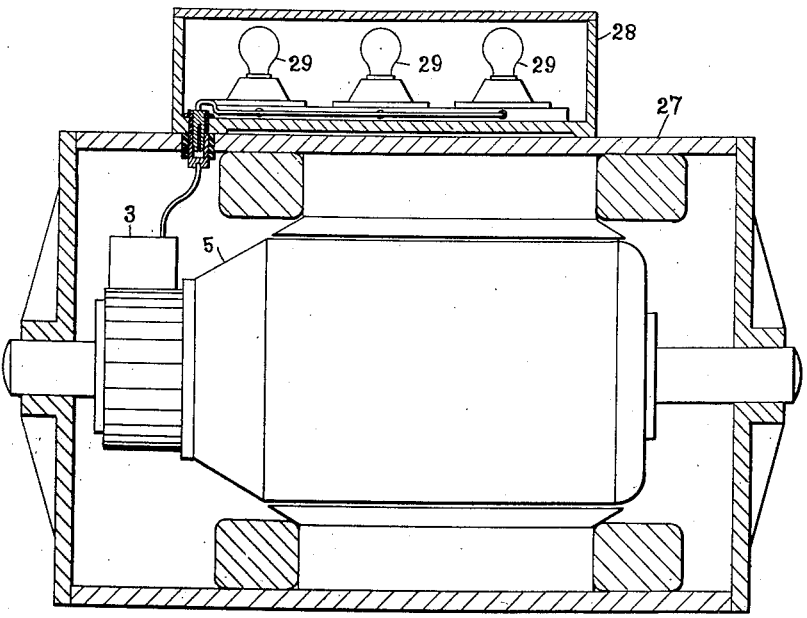
Fig. 4 is a longitudinal section, partly diagrammatic, of a dynamo showing a preferred type of mounting for the resistor.

In Fig. 4 is illustrated a preferred form of mounting for the resistor 18 to enable the latter to be carried with a minimum of space and wiring expense where such items are important factors, as in automobile lighting systems. Mounted upon the dynamo casing 27 is a ventilated box 28 containing one or more resistor elements 29, the external terminals of which pass respectively to the head-light switch, (Figs. 1, 2 and 3) or head-light relay (Figs. 5 and 6), and to one of the brushes 3 of the dynamo. The latter connection as shown is by a plug and socket arrangement. In the present instance the resistor is illustrated conventionally as three incandescent lamps having filaments of boron or other suitable material with preferably a negative temperature coefficient as explained above, said lamps being connected in parallel.

Figure 5:
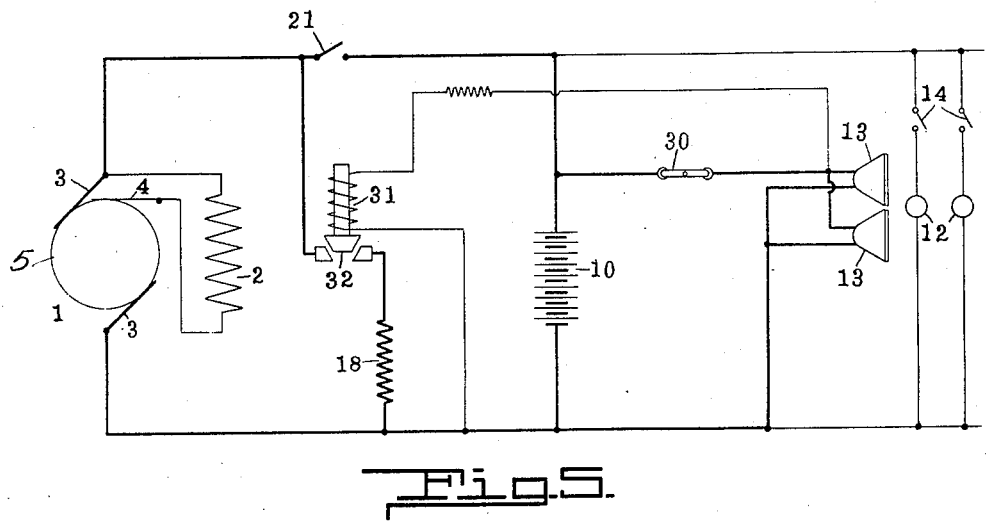
Figs. 5 and 6 are further modifications of the vehicle-lighting system illustrating a constant-current control with different forms of switch for the resistor circuit.

In Fig. 5 the dynamo 1 is illustrated as provided with the third-brush constant-current regulation 2, 3, 4 of Fig. 1, together with the small lamps 12, head-lights 13 and battery 10 therein illustrated. The main switch is shown conventionally at 21. In the present embodiment of the invention the two-way head-light switch 15 of Figs. 1, 2 and 3 is replaced by a one-way switch 30 which when closed to connect the head-lights across the mains simultaneously energizes the voltage coil 31 of a relay 32 whose contacts are in the circuit of the resistor 18. From this it will be seen that whenever the head-lights are in circuit the resistor circuit is open at the relay contacts. The operation of this apparatus is otherwise similar to that of Fig. 1, and need not be considered in detail. It will be obvious however, that this relay control of the resistor circuit may readily be applied to other embodiments of the invention.

Figure 6:
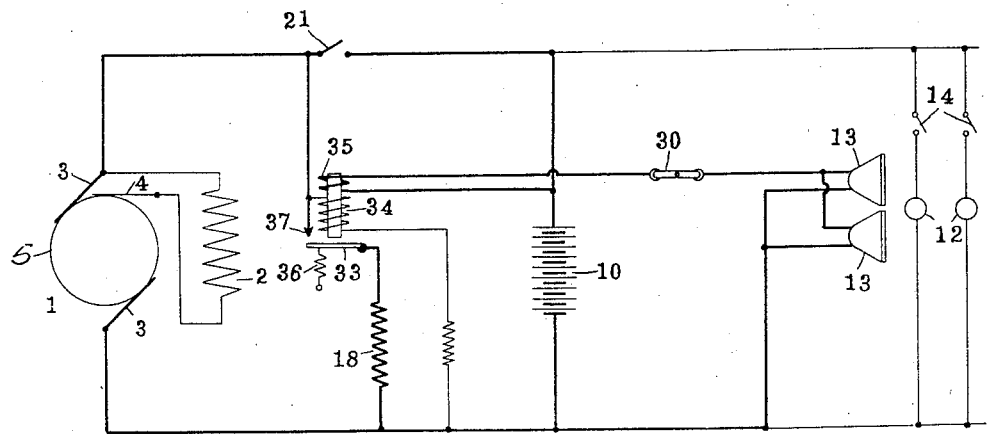

Referring now to Fig. 6, a modification more nearly analogous to Figs. 1 and 5, there is illustrated a resistor-circuit relay 33, whose movable contact is acted upon in the present instance by a generator-voltage coil 34 opposing a head-light current coil 35. When the head-lights are turned on as by the head-light switch 30, the current coil 35 of the relay opposes the voltage coil 34 sufficiently to allow the spring 36 to open the resistor circuit at the relay contacts 33, 37. In this embodiment of the invention there is the additional protective feature of preventing overcharge of the battery, since when the battery voltage reaches its full-charge value the voltage coil 34 is energized sufficiently to close the resistor circuit at the relay contacts 33, 37, thus diverting from the battery a part of the constant output of the dynamo. If in this condition, when most of the current goes to the resistor and comparatively little to the battery, the head-lights are turned on, the current used by the head-lights will normally be greater than the generator current then delivered through the main switch, the battery will begin to discharge, accompanied by a marked decrease in the strength of the voltage coil 34 and this lowered voltage across the coil 34, coupled with the opposition now afforded by the current coil 35 will cause the switch 33 to open promptly. In this way many of the advantages of constant-current regulation are secured, and in addition many of the advantages of constant-voltage regulation, such as a reduced charging current when the battery becomes fully charged and an increase of the useful output of the generator simultaneously with a material increase in the load. Inasmuch as the apparatus of Fig. 6 resembles that of Fig. 1, except as above noted, no further description need be given.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language might be said to fall therebetween.

Having described my invention, what I claim as new and desire to secure by Letters Patent is:

1. Apparatus of the class described, comprising, in combination, a dynamo, an external circuit therefor comprising a battery adapted to be charged from said dynamo and a load, a constant current regulator for said dynamo, an artificial load, and means connecting said artificial load across said dynamo when said first load is disconnected.

2. In apparatus of the class described in combination, a constant current dynamo, a battery across the terminals of said dynamo, a switch between said dynamo and said battery, a resistor on the dynamo side of said switch, a load on the other side of the switch, and means for disconnecting the resistor from the dynamo when a single major portion of the load is connected across the mains.

3. In an electrical system for motor vehicles in combination, a constant current generator, a storage battery adapted to be charged thereby, a translating device adapted to receive current from said generator or said battery, and means to prevent a rise of charging current through said battery when said translating device is disconnected.

4. In an electrical system for motor vehicles in combination, a constant current generator, a battery across said generator, a translating device across said generator and said battery and means for bringing about a tapering charge of said battery when said translating device is disconnected.

5. Apparatus of the class described, comprising, in combination, a dynamo, an external circuit therefor, constant current regulating means for said dynamo, an artificial load of negative temperature coefficient, and means for connecting said artificial load across said dynamo upon effecting a material increase in the effective resistance of the external circuit.

6. Apparatus of the class described, comprising, in combination, a dynamo, an external circuit therefor comprising a battery adapted to be charged from said dynamo and a load, constant current regulating means for said dynamo, an artificial load of negative temperature coefficient, and means for connecting said artificial load across said dynamo when said first load is disconnected.

7. Apparatus of the class described, comprising, in combination, a dynamo, an external circuit for said dynamo comprising a battery adapted to be charged from said dynamo and a load, a constant current regulator for said dynamo, an artificial load comprising boron conductors, and means for connecting said artificial load across said dynamo when said first load is disconnected.

8. Apparatus of the class described, comprising, in combination, an engine, a dynamo driven thereby, a storage battery adapted to be charged from said dynamo, means for regulating the output of said dynamo, a switch adapted to connect the dynamo to the battery, a resistance connected on the generator side of the switch and absorbing a material portion of the generator current, a translation circuit, and means for connecting and disconnecting said translation circuit, said last named means serving to connect the resistance across the generator when said circuit is open, and to disconnect said resistance when said circuit is closed.

9. In an electrical system for motor vehicles in combination, a constant current generator, a plurality of translating devices adapted to be connected across said generator, a resistor adapted to be connected across said generator, and means whereby said resistor is connected to take current when translating devices taking the major portion of the load are disconnected, and for disconnecting said resistor when said translating devices last mentioned are connected.

In testimony whereof I affix my signature, in the presence of two witnesses.

JOSEPH BIJUR.

Witnesses:
D. G. HAYNES,
C. J. KULBERG.